Jan. 25, 1927.

M. R. HUTCHISON

POWER TRANSMISSION

Filed Oct. 4, 1923

1,615,544

INVENTOR
Miller Reese Hutchison
BY
Robert S. Blair
ATTORNEY

Patented Jan. 25, 1927.

1,615,544

UNITED STATES PATENT OFFICE.

MILLER REESE HUTCHISON, OF LLEWELLYN PARK, NEW JERSEY, ASSIGNOR TO THE SAFETY CAR HEATING & LIGHTING COMPANY, A CORPORATION OF NEW JERSEY.

POWER TRANSMISSION.

Application filed October 4, 1923. Serial No. 666,433.

This invention relates to power transmission and with regard to its more specific features to the transmission of power through friction drive as by pulley and belt.

One of the objects of the invention is to provide apparatus for frictional transmission of power which is highly efficient and fulfills the requirements of various conditions of practical use in a highly effective manner. Another object is to provide apparatus of the above nature which is strong and dependable and capable of long continued service and wear. Another object is to provide such apparatus in which the parts subjected to wear and deterioration are easily repaired or replaced. Another object is to provide an efficient art relating to friction power transmission which is readily and conveniently applicable to the conditions of practical operation. Further objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

Figure 1:
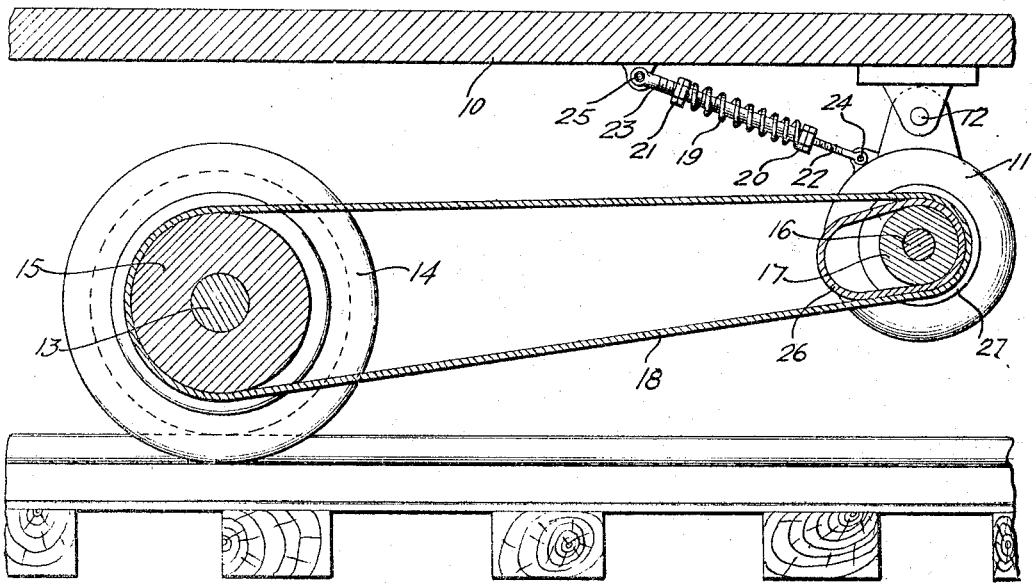
Figure 2:
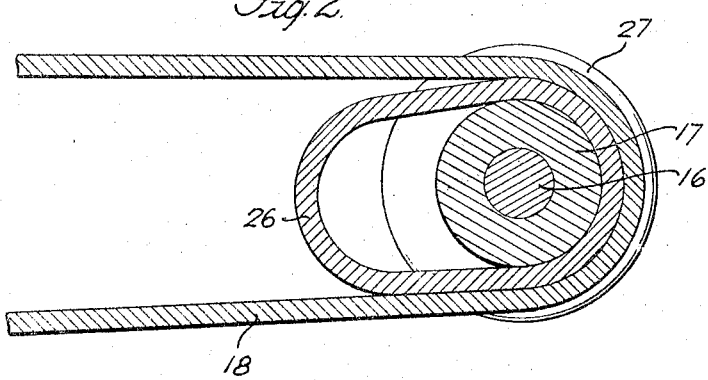

In the accompanying drawing in which are shown one of the various possible embodiments of the several mechanical features of this invention, Figure 1 shows diagrammatically a power transmitting apparatus driving an electric generator from a railroad car axle, and Figure 2 is an enlarged sectional view of parts shown in Figure 1.

Similar reference characters refer to similar parts in both views of the drawing.

Referring now to the drawing in detail there is shown diagrammatically a portion 10 of a railroad car from which is suspended a generator 11 for example by means of a pivotal connection 12 about which the generator is capable of swinging in a direction longitudinal of the car body. There is also shown an axle 13 of the car carrying the wheel 14 and upon the axle 13 is mounted a flanged pulley 15. Upon the armature shaft 16 of the generator 11 is a pulley 17 through which the generator is driven by a belt 18 from the pulley 15 upon the car axle as will be later described. Tension is maintained in the driving belt 18 by suitable means urging the generator 11 in a direction away from the car axle 13 which means may take the form of an adjustable spring connection between the generator 11 and the car frame 10 urging the generator 11 to swing about its suspension 12. For example, as shown in the drawing there may be provided a compression spring 19 urging the geneator 11 in a direction away from the car axle 13 and the compression in which is adjusted by adjustment of the lock nuts 20 and 21 threaded respectively upon a rod 22 and a sleeve member 23. In this construction as shown in the drawing the spring 19 is compressed between the nuts 20 and 21, the rod 22 fitting within the sleeve 23 and being pivotally connected as at 24 with the generator 11 and the sleeve 23 being pivotally connected to the car frame as at 25. Thus by adjustment of the nuts 20 and 21 the compression in the spring 19 may be varied and the force with which the generator 11 is urged away from the axle 13 and hence the tension in the driving belt 18, may be regulated.

The generator 11 is driven through the belt 18 from the variably driven car axle 13 and ordinarily charges a storage battery and supplies a lamp circuit for lighting purposes on the railroad car. Since the current taken from the generator varies, and since the speed of rotation of the car axle may vary within wide limits, it is desirable that the driving connection between the car axle and the generator yield when the load on the generator exceeds a predetermined value in order to avoid danger of harm to the generator and to the storage battery and circuit fed thereby. The tension in the driving belt 18 may be adjusted so that slippage will occur between the frictional driving surfaces when the load upon the generator exceeds the desired maximum value which it is desired that the generator carry. However, when such slippage is permitted to occur on the driving surface of the driving belt itself, heating of the belt and wear and deterioration thereof soon result which materially weaken the belt, lessening the life thereof.

As is shown in detail in Figure 2 of the drawings, there is interposed between the driving belt 18 and the surface of the driven pulley 17 a member which preferably takes the form of a short endless belt member 26. The member 26 in frictional engagement with the driving surface of the belt 18 and with the surface of the pulley 17 transmits the driving force therebetween. The short belt member 26 is made so that its outer surface in engagement with the belt 18 has a higher co-efficient of friction relative thereto than has its inner surface relative to the pulley surface with which it is in engagement. Therefore slippage will occur between the member 26 and the pulley surface and not between the member 26 and the belt 18 so that wear occasioned by such slippage is taken by the short belt member 26. This short belt member may be made of a material which is not as susceptible to wear as would be the driving belt 18 and which has the desired slipping qualities relative to the pulley surface adapted to permit the drive to slip at the desired load upon the generator. By way of example the driving belt 18 might be made of rubberized canvas and the short belt member 26 might be made of tough leather. Furthermore, the friction surface of the belt 18 and the outer surface of the member 26 might be treated with a suitable belt grease in order to avoid with certainty slipping between these surfaces. The member 26 may also be made or treated so as to be affected little or not at all by heating. The short belt member 26 is preferably made of a length so that it may be conveniently slipped into or out of place over the flange 27 of the pulley 17.

By means of the device above described, the driving belt is freed from the harmful effects of the slippage occurring in the driving connection. The heat and wear due to such slippage is localized in a small inexpensive member which may be conveniently constructed to have the properties most desired for permitting the slippage to occur and coping with the consequences thereof. The short belt member may be made of a material which is particularly advantageous when subjected to inclement weather conditions. Thus the surface of the member 26 engaging the pulley 17 may have a greater coefficient of friction thereon than would the driving belt 18 so that the device serves to prevent undesirable slipping as well as to permit slipping at the desired load. Particularly under unfavorable weather conditions the driving belt 18 if applied directly to the pulley might permit undesirable slippage in the drive whereas the short belt member 26 interposed therebetween having a greater coefficient of friction on the pulley than would the driving belt 18 overcomes this difficulty. If the parts become coated with ice so that the member 26 does slip on the pulley at starting, the heat generated by such slipping being localized in this short belt member soon serves to melt the ice so that normal operation is quickly attained. It will further be seen that should the short belt member 26 wear out and hence be no longer operative, the spring suspension of the generator will cause the driving belt 18 to transmit the torque directly to the pulley so that no interruption of drive is occasioned before a new member 26 may be conveniently substituted. A new belt member 26 may be slipped over the pulley flange and into place with the greatest ease.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. In apparatus of the character described, in combination, an electric generator positioned beneath a railroad car, a flat driving belt adapted to drive said generator from an axle of said car, means mounting said generator for movement toward and away from said axle, an adjustable spring urging said generator away from said axle in opposition to the pull of said belt upon said generator, and a short endless belt loosely interposed between said driving belt and the generator pulley, the outer surface of said short belt having a higher coefficient of friction with respect to said driving belt than has the inner surface thereof with respect to said pulley, said short belt being adapted to slip upon said pulley when the load upon said generator exceeds a predetermined value determined by the adjustment of said spring, and being adapted to take the wear and localize the heat occasioned by said slippage.

2. In apparatus of the character described, in combination, an electric generator positioned beneath a railroad car, a flat driving belt adapted to drive said generator from an axle of said car, means mounting said generator for movement toward and away from said axle, an adjustable spring urging said generator away from said axle in opposition to the pull of said belt upon said generator, and a short endless belt loosely interposed between said driving belt and the generator pulley, the outer surface of said short belt having a higher coefficient of friction with respect to said driving belt than has the inner surface thereof with respect to said pulley, said short belt being adapted to slip upon said pulley when the load upon said generator exceeds a predetermined value determined by the adjustment of said spring, and being made of a wear-resisting material treated to be unaffected by the heat occasioned by said slipping.

3. In apparatus of the character described, in combination, an electric generator positioned beneath a railroad car, a flat driving belt adapted to drive said generator from an axle of said car, means mounting said generator for movement toward and away from said axle, an adjustable spring urging said generator away from said axle in opposition to the pull of said belt upon said generator, and a short endless belt of substantially the same width as said driving belt loosely positioned about the generator pulley and of a length just adapted to slip over the flanges thereof for positioning and removal, said short belt being interposed between said driving belt and said pulley and the outer surface thereof having a higher co-efficient of friction with respect to said driving belt than has the inner surface thereof with respect to said pulley, said short belt being adapted to slip upon said pulley when the load upon said generator exceeds a predetermined value determined by the adjustment of said spring, and being adapted to take the wear and localize the heat occasioned by said slippage.

In testimony whereof, I have signed my name to this specification this 27th day of September, 1923.

MILLER REESE HUTCHISON.